United States Patent
Shah (10) Patent No.: US 8,035,812 B2
(45) Date of Patent: Oct. 11, 2011

(54) SYSTEM AND METHOD FOR MEASURING DISPLAY QUALITY WITH A HYPERSPECTRAL IMAGER

(75) Inventor: Hemang J Shah, San Diego, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 340 days.

(21) Appl. No.: 12/410,409

(22) Filed: Mar. 24, 2009

(65) Prior Publication Data
US 2010/0245833 A1 Sep. 30, 2010

(51) Int. Cl.
*G01J 3/00* (2006.01)
*G01N 21/88* (2006.01)

(52) U.S. Cl. ............... 356/300; 356/326; 356/237.1; 348/191

(58) Field of Classification Search .............. None
See application file for complete search history.

(56) References Cited

U.S. PATENT DOCUMENTS

| | | |
|---|---|---|
| 5,559,358 A | 9/1996 | Burns et al. |
| 6,040,937 A | 3/2000 | Miles |
| 6,077,452 A | 6/2000 | Litvak |
| 6,160,541 A | 12/2000 | Palalau et al. |
| 6,285,207 B1 | 9/2001 | Listwan |
| 6,567,715 B1 | 5/2003 | Sinclair et al. |
| 6,657,218 B2 | 12/2003 | Noda |
| 6,674,562 B1 | 1/2004 | Miles |
| 6,734,977 B2 | 5/2004 | Noda |
| 6,781,702 B2 | 8/2004 | Giannakopoulos et al. |
| 6,950,193 B1 | 9/2005 | Discenzo |
| 7,026,821 B2 | 4/2006 | Martin |
| 7,123,216 B1 | 10/2006 | Miles |
| 7,327,510 B2 | 2/2008 | Cummings et al. |
| 7,423,287 B1 | 9/2008 | U'Ren et al. |
| 7,580,176 B2 | 8/2009 | Cummings et al. |
| 2004/0042000 A1 | 3/2004 | Mehrl et al. |
| 2005/0030551 A1 | 2/2005 | Rosakis et al. |
| 2005/0042777 A1 | 2/2005 | Boger et al. |
| 2006/0114243 A1 | 6/2006 | Iwasaki |
| 2006/0243023 A1 | 11/2006 | Wong |
| 2007/0201038 A1 | 8/2007 | Cummings et al. |

(Continued)

FOREIGN PATENT DOCUMENTS

GB 2 217 839 11/1989

(Continued)

OTHER PUBLICATIONS

Headwall Photonics, Application Note, Process Manufacturing—Hyperspectral Imaging, Document #AN2009-09, Jan. 2009, (retrieved Apr. 21, 2011 from http://www.headwallphotonics.com/downloads/app-notes/Process-Manufacturing-Headwall.pdf.*

(Continued)

*Primary Examiner* — Fannie L. Evans
(74) *Attorney, Agent, or Firm* — Knobbe Martens Olson & Bear LLP (57) ABSTRACT

A system and method for measuring display quality by using a hyperspectral imager are disclosed. In one embodiment, the system comprises a hyperspectral imager configured to determine an intensity of light for a plurality of locations in a first area on a display for a plurality of spectral channels, and a processor configured to determine a measure of display quality based on the determined intensities.

27 Claims, 9 Drawing Sheets

U.S. PATENT DOCUMENTS

| | | |
|---|---|---|
| 2009/0051369 A1 | 2/2009 | Kogut et al. |
| 2009/0201008 A1 | 8/2009 | Govil |
| 2009/0201009 A1 | 8/2009 | Govil |
| 2009/0201033 A1 | 8/2009 | Govil |
| 2009/0201034 A1 | 8/2009 | Govil |
| 2009/0204350 A1 | 8/2009 | Govil et al. |
| 2009/0207159 A1 | 8/2009 | Govil |
| 2009/0213107 A1 | 8/2009 | Govil |
| 2009/0251157 A1 | 10/2009 | Govil |
| 2009/0319218 A1 | 12/2009 | Nachman et al. |
| 2010/0321761 A1 | 12/2010 | Cummings et al. |

FOREIGN PATENT DOCUMENTS

| | | |
|---|---|---|
| WO | WO 02/093116 | 11/2002 |

OTHER PUBLICATIONS

Barducci et al., 2007, Aerospace wetland monitoring by hyperspectral imaging sensors: a case study in the coastal zone of San Rossore Natural Park, Journal of Environmental Management, XXX:1-9.

Bashevoy et al., 2007, Hyperspectral imaging of plasmonic nanostructures with nanoscale resolution, Optics Express, 15(18):11313-11320.

Bonifazi et al., 2006, Hyperspectral imaging based techniques in fluff characterization, Advanced Environmental, Chemical, and Biological Sensing Technologies IV, Proc. of SPIE, 6377: 63770O-1-63770O-10.

Cobb et al., 2008, Innovative manufacturing and test technologies for imaging hyperspectral spectrometers, Algorithms and Technologies for Multispectral, Hyperspectral, and Ultraspectral Imagery XII, Proc. of SPIE, 6233:62330R-1-62330R-9.

El Masry et al., 2007, Hyperspectral imaging for nondestructive determintaion of some qualify attributes for strawberry, Journal of Food Engineering, 81:98-107.

Gat, Mar. 1999, Directions in Environmental Spectroscopy, Spectroscopy Showcase, 2 pp.

Hartke et al.. Jan. 2007, Snapshot dual-band visible hyperspectral imaging spectrometer, Optical Engineering 46(1):013201-1-013201-7.

Ingram, 2008, Combining hyperspectral imaging and raman spectroscopy for remote chemical sensing, Chemical, Biological, Radiological, Nuclear, and Explosives (CBRNE) Sending IX, Proc. of SPIE, 6954: 695405-1-695405-7.

Ivanco et al., 2007, Real-time airborne hyperspectral imaging of land mines, Detection and Remediation Technologies for Mines and Minelike Targets XII, Proc. of SPIE, 6553:655315-1-655315-2.

Jusoff, 2008, Search and rescue (SAR) operations for the missing Bell 206 Long Ranger helicopter in Sarawak, Malaysia, using near real-time airborne hyperspectral imaging system, Disaster Prevention and Management, 17(1):94-103.

Liu et al., 2006, Development of simple algorithms for the detection of fecal contaminants on apples from visible/near infrared hyperspectral reflectance imaging, Journal of Food Engineering, 81:412-418.

Luet et al., 2004, P-58: Imagining polization interferometer for flat panel display characterization, SID 04 Digest, pp. 466-469.

McFee et al., 2007, Landmine detection using passive hyperspectral imaging, Chemical and Biological Sensing III, Proc. of SPIE, 6554:655404-1-655404-2.

Smith, Randall, Jul. 14, 2006, "Introduction to Hyperspectral Imaging," www.microimages.com/getstart/pdf/hyprspec.pdf, p. 1-24.

Mineo—User Need Document, 2002, Part 3: State of the art of remote sensing and GIS applied to environmental studies related to mining activities, 63 pp.

Pons-Nin et al., Jun. 2002, Voltage and pull-in time in current drive of electrostatic actuators, Journal of Microelectromechanical Systems, 11(3):196-205.

Qiao et al., 2007, Pork quality and marbling level assessment using a hyperspectral imaging system, Journal of Food Engineering, 83:10-16.

Qin et al., 2008, Measurement of the optical properties of fruits and vegetable using spatially resolved hyperspectral diffuse reflectance imaging technique, Postharvest Biology and Technology, 49:355-365.

Shlens, Jonathon, "A Tutorial on Principal Component Analysis," http://www.snl.salk.edu/~shlens/pca.pdf, Salk Institute for Biological Studies, Dec. 10, 2005, p. 1-13.

Smith, Lindsay, "A Tutorial on Principle Components Analysis," http://www.cs.otago.ac.nz/cosc453/student_tutorials/principal_components.pdf, Univerity of Otago, Department of Computer Science, Feb. 26, 2002, p. 1-26.

Vo-Dinh et al., Sep. 2004, A hyperspectral imaging system for in vivo optical diagnostics, Engineering in Medicine and Biology Magazine, pp. 40-49.

Ye et al., 2008, A ground-based hyperspectral imaging system for characterizing vegetation spectral features, Computers and Electronics in Agriculture, 63:13-21.

Yiqun et al., 2007, Compact hyperspectral imaging system with a convex grating, Optical Design and Testing III, Proc. of SPIE, 6834:68340Y-1-68340Y-9.

Conner, "Hybrid Color Display Using Optical Interference Filter Array," SID Digest, pp. 577-580 (1993).

Guckel et al., "Fine-Grained Polysilicon Films with Built-In Tensile Strain," IEEE Transactions on Electron Devices, vol. 35, No. 6, pp. 801-802, (1988).

Jerman et al., "A Miniature Fabry-Perot Interferometer with a Corrugated Silicon Diaphragm Support," IEEE Electron Devices Society (1988).

Lin et al., "A Micro Strain Gauge with Mechanical Amplifier," J. of Microelectromechanical Systems, vol. 6, No. 4, (1997).

Miles, "MEMS-based interferometric modulator for display applications," Proc. SPIE vol. 3876, pp. 20-28, Sep. 1999.

Miles, "5.3: Digital Paper™: Reflective Displays Using Interferometric Modulation," SID 00 Digest, pp. 32-35 (2000).

Miles, 10.1: Digital PaperTM for Reflective Displays, SID 02 Digest, pp. 115-117 (2002).

Miles et al., "Digital Paper™ for Reflective Displays," J. of the Society for Information Display Soc. Inf. Display USA. vol. 11, No. 1, p. 209-215. (2003).

Raley et al., "A Fabry-Perot Microinterferometer for Visible Wavelengths," IEEE Solid-State Sensor and Actuator Workshop, Hilton Head, SC (1992).

Singh et al., "Strain Studies in LPCVD Polysilicon for Surface Micromachined Devices," Sensors and Actuators, vol. 77, pp. 133-138, (1999).

Srikar et al., "A Critical Review of Microscale Mechanical Testing Methods Used in the Design of Microelectromechanical Systems," Society for Experimental mechanics, vol. 43, No. 3, (2003).

van Drieenhuizen, et al., "Comparison of Techniques for measuring Both Compressive and Tensile Stress in Thin Films." Sensors and Actuators, vol. 37-38, pp. 759-765. (1993).

Zhang, et al., "Measurements of Residual Stresses in Thin Films Using Micro-Rotating-Structures." Thin Solid Films, vol. 335, pp. 97-105, (1998).

Castaner et al., Sep. 1999, Speed-energy optimization of electrostatic actuators based on pull-in, Journal of Microelectromechanical Systems, 8(3):290-298.

Castaner et al., May 1, 2000, Pull-in time-energy product of electrostatic actuators: comparison of experiments with simulation, Sensors and Actuators, 83(1-3):263-269.

\* cited by examiner

|  | Column Output Signals | |
|---|---|---|
|  | $+V_{bias}$ | $-V_{bias}$ |
| Row Output Signals  0 | Stable | Stable |
| $+\Delta V$ | Release | Actuate |
| $-\Delta V$ | Actuate | Release |

SYSTEM AND METHOD FOR MEASURING DISPLAY QUALITY WITH A HYPERSPECTRAL IMAGER

BACKGROUND

1. Field

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One aspect of the development is a method of measuring the quality of a display, the method comprising determining an intensity of light with a hyperspectral imager for a plurality of locations in a first area of a display for a plurality of spectral channels, and determining a measure of display quality based on the determined intensities.

Another aspect of the development is a system for measuring the quality of a display, the system comprising a hyperspectral imager configured to determine an intensity of light for a plurality of locations in a first area on a display for a plurality of spectral channels, and a processor configured to determine a measure of display quality based on the determined intensities.

DETAILED DESCRIPTION OF THE CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Hyperspectral imagers are proposed for the evaluation of displays. Hyperspectral imagers collect spectral data simultaneously from a number of locations, as opposed to traditional spectrometers/spectroradiometers that collect single-point data. In some hyperspectral imagers, spectral data is collected along a line, wherein data from successive line measurements corresponding to a translation along a single axis of the device under test (DUT) are appended to data from previous line measurements. Thus, the spectral information from the entire display is available. When evaluating multiple displays at once, post-processing of data allows for filtering data from each display. This method is suitable for single devices, as well as assembly line evaluation of devices. One such display which may benefit from evaluation in the above-described manner is an interferometric modulator display.

Interferometric Modulator Displays

Figure 1:
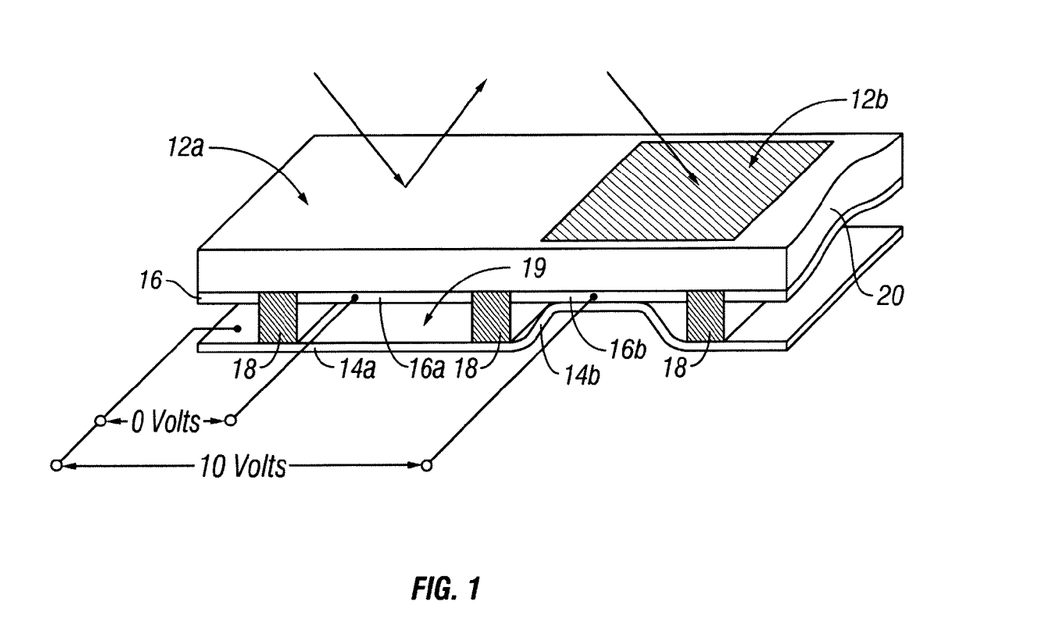
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
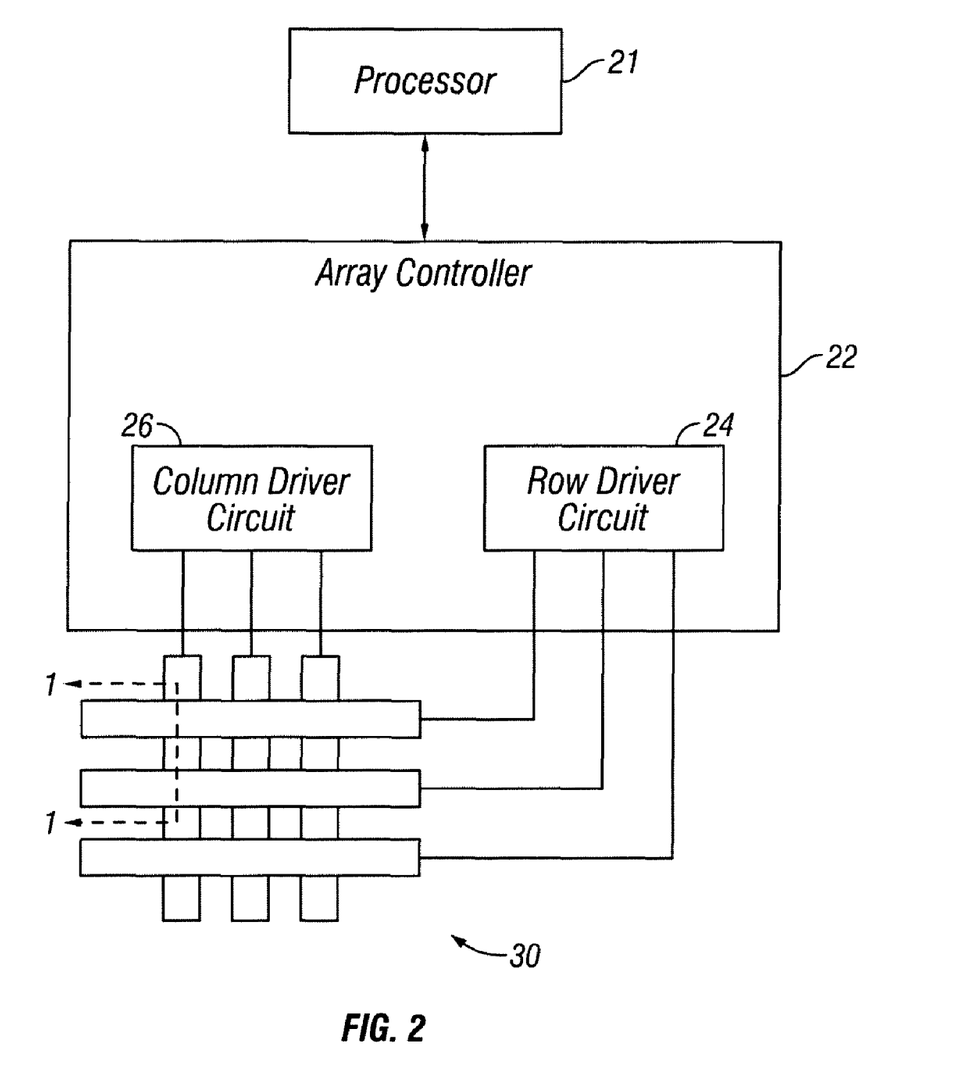
FIG. 2 is a system block diagram illustrating one embodiment of an electronic device incorporating a 3×3 interferometric modulator display.
Figure 3:
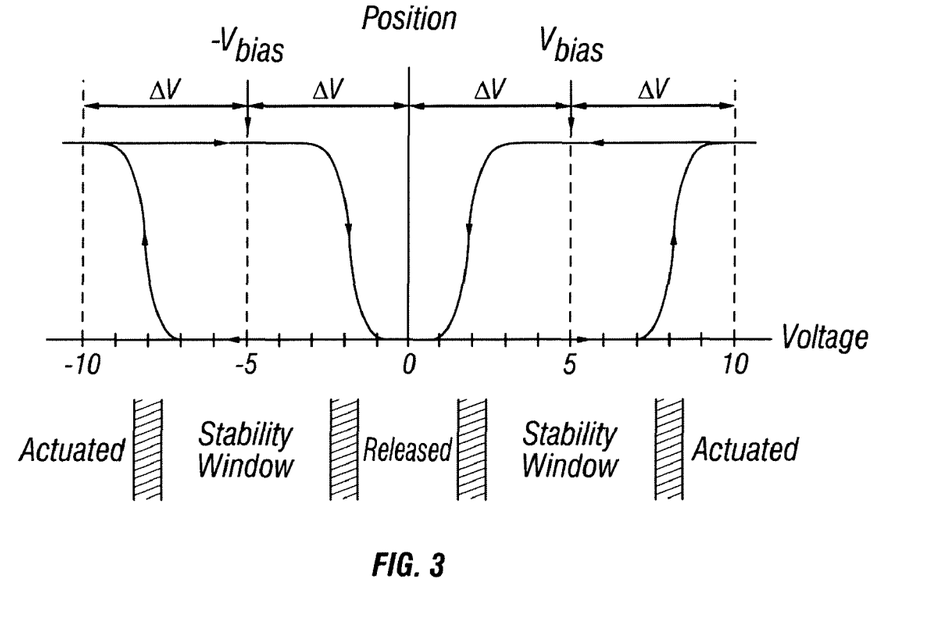
FIG. 3 is a diagram of movable mirror position versus applied voltage for one exemplary embodiment of an interferometric modulator of FIG. 1.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figure 4:
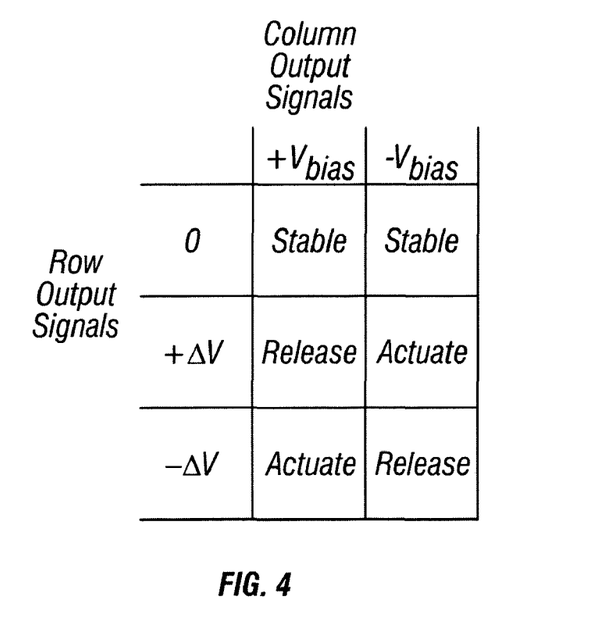
FIG. 4 is an illustration of a set of row and column voltages that may be used to drive an interferometric modulator display.
Figure 5A:
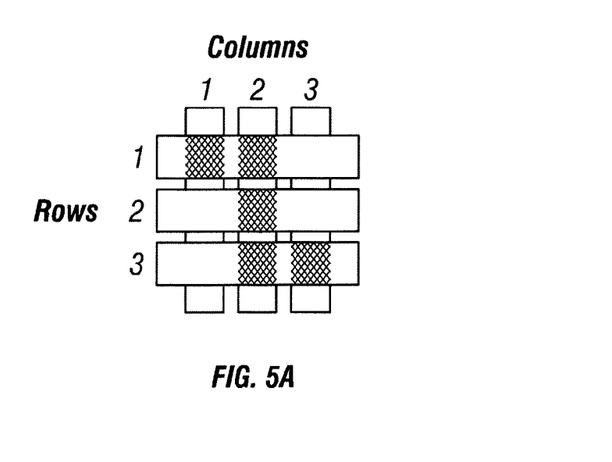
FIGS. 5A and 5B illustrate one exemplary timing diagram for row and column signals that may be used to write a frame of display data to the 3×3 interferometric modulator display of FIG. 2.
Figure 5B:
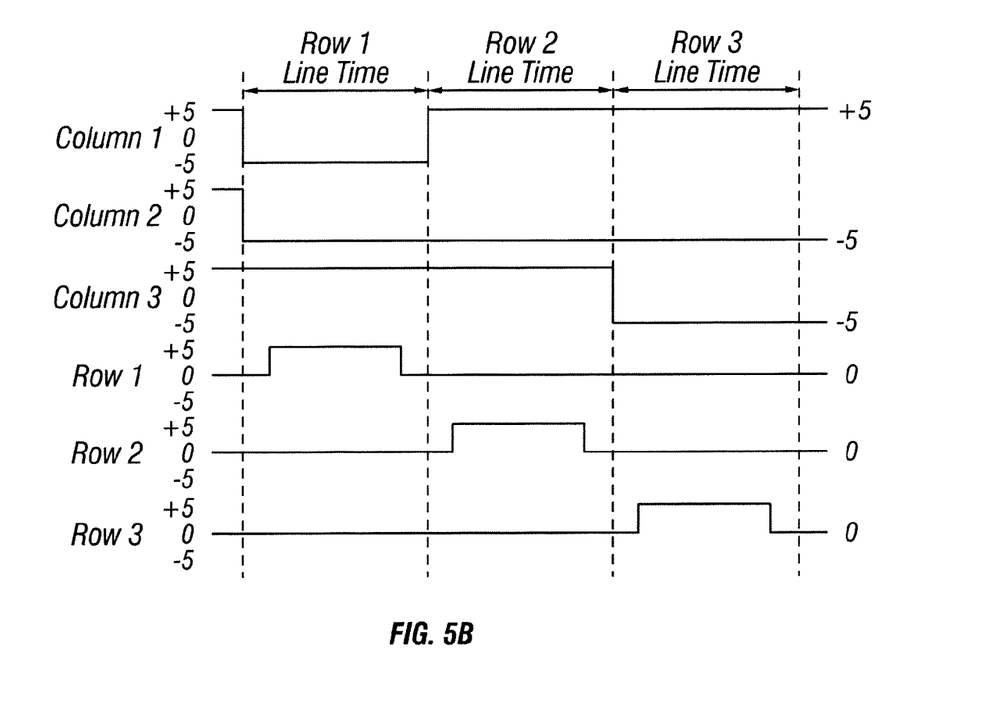

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$ or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
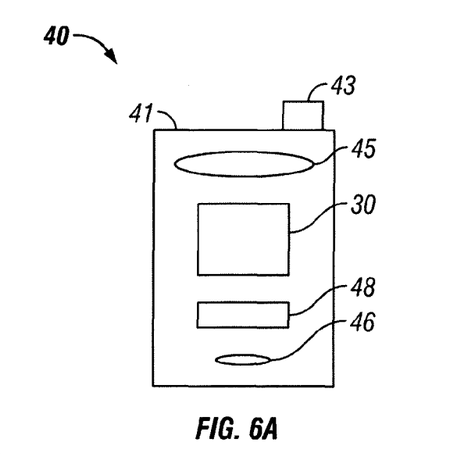
FIGS. 6A and 6B are system block diagrams illustrating an embodiment of a visual display device comprising a plurality of interferometric modulators.
Figure 6B:
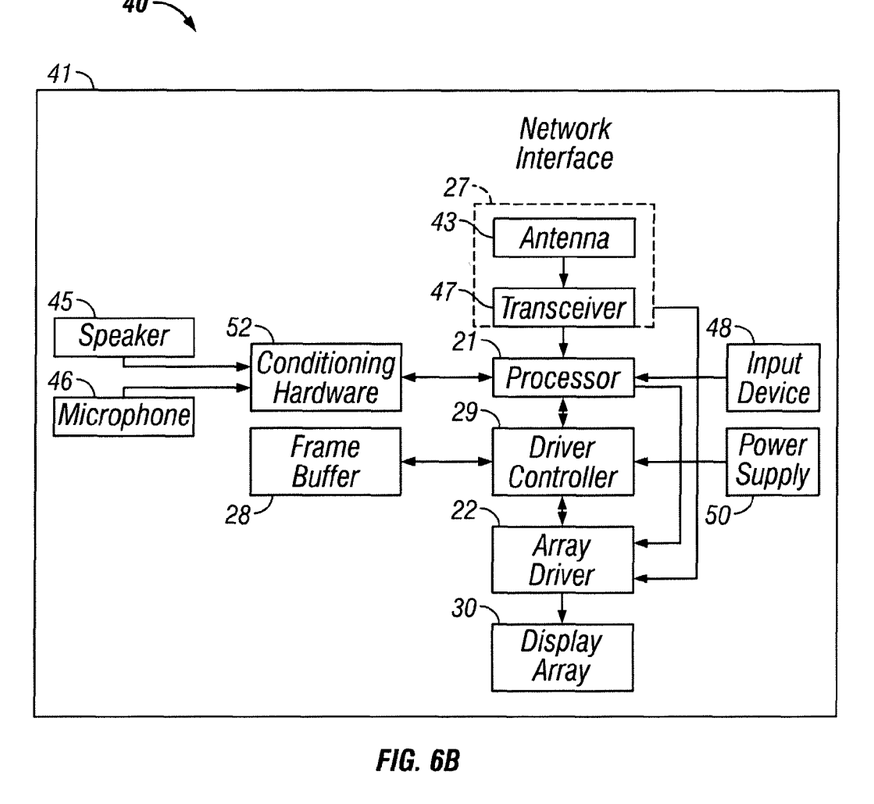

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUE-TOOTH standard. In the case of a cellular telephone, the antenna is designed to receive CDMA, .GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
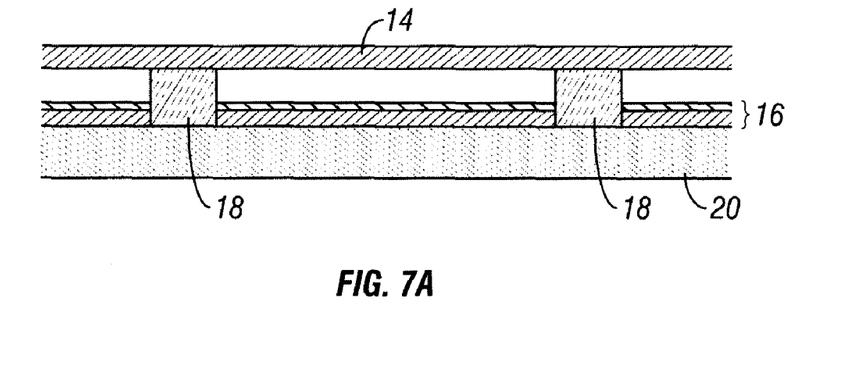
FIG. 7A is a cross section of the device of FIG. 1.
Figure 7B:
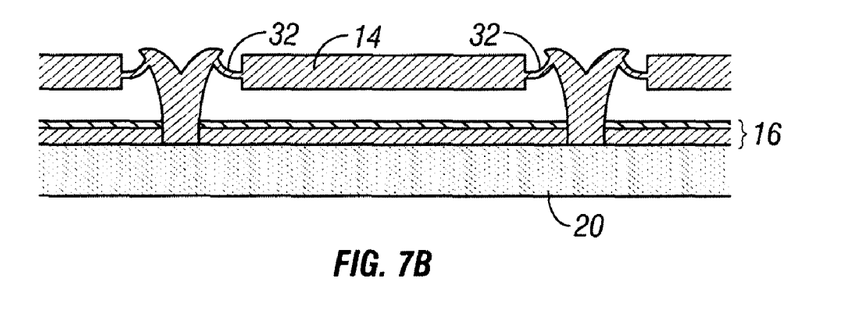
FIG. 7B is a cross section of an alternative embodiment of an interferometric modulator.
Figure 7C:
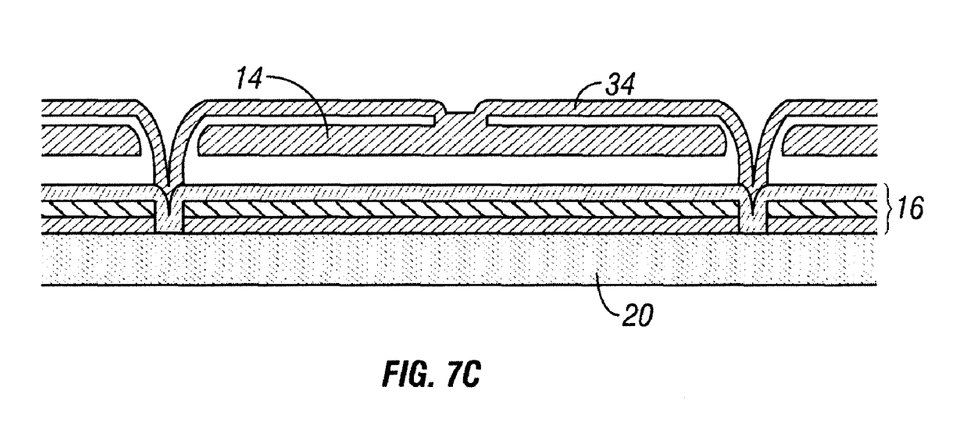
FIG. 7C is a cross section of another alternative embodiment of an interferometric modulator.
Figure 7D:
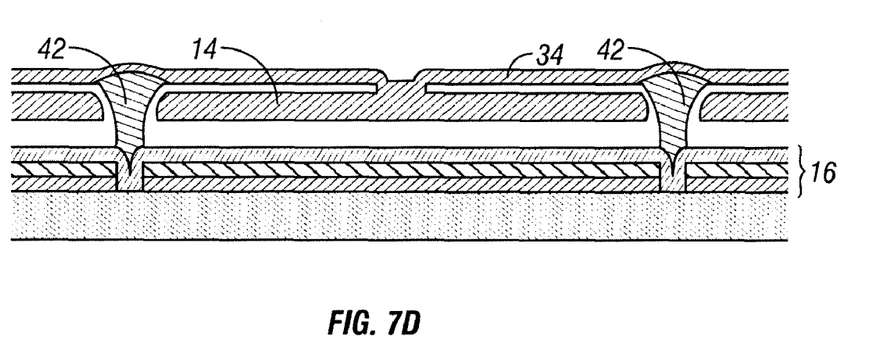
FIG. 7D is a cross section of yet another alternative embodiment of an interferometric modulator.
Figure 7E:
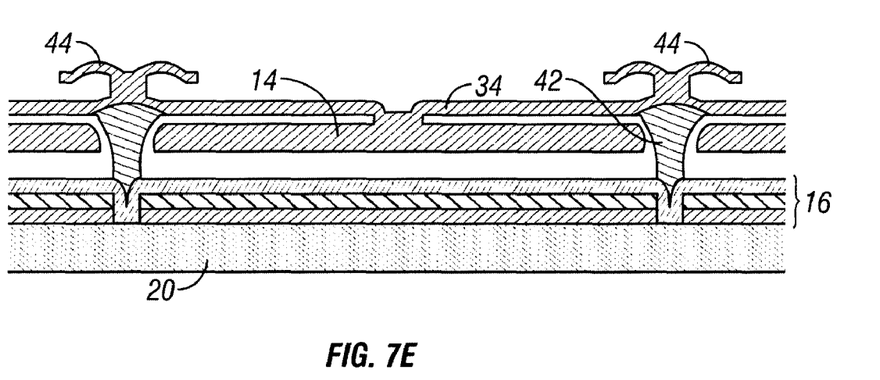
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Hyperspectral Imaging

Evaluation of chromaticity coordinates measurements may be used to characterize display devices. To obtain chromaticity coordinates, one may have to measure the spectral performance (reflection, transmission, or emission) of the device. Hyperspectral imagers are one type of instrument that may be used for the evaluation of the reflection, transmission, or emission of a device. Using a hyperspectral imager, it is possible to obtain the spectral information of a large area.

In one embodiment, the data is collected on line-by-line basis. Thus, at the completion of a number of successive measurements in which the instrument or device is moved with respect to the other, the spectral information (such as intensity and/or wavelength response) is available for a large area of the device. Various methods for analyzing displays can be performed using this data set, including the 5-point test, the 9-point test, uniformity and non-uniformity tests, and defect identification. All of these tests may be possible on the basis of a single measurement thereby saving instrument time. In other embodiments, multiple measurements, each measurement corresponding to a state of the device, are performed. Using the spectral data recorded, it is possible to build a visual representation of the area of the device measured. Thus, one can obtain a true visualization of the spectral information. In contrast to a color camera that generates the visualization through a color-filtered charge-coupled device (CCD) array, the representation through a hyperspectral imager is more accurate since it uses intensity counts from a larger number of different wavelengths or spectral channels.

Figure 8:
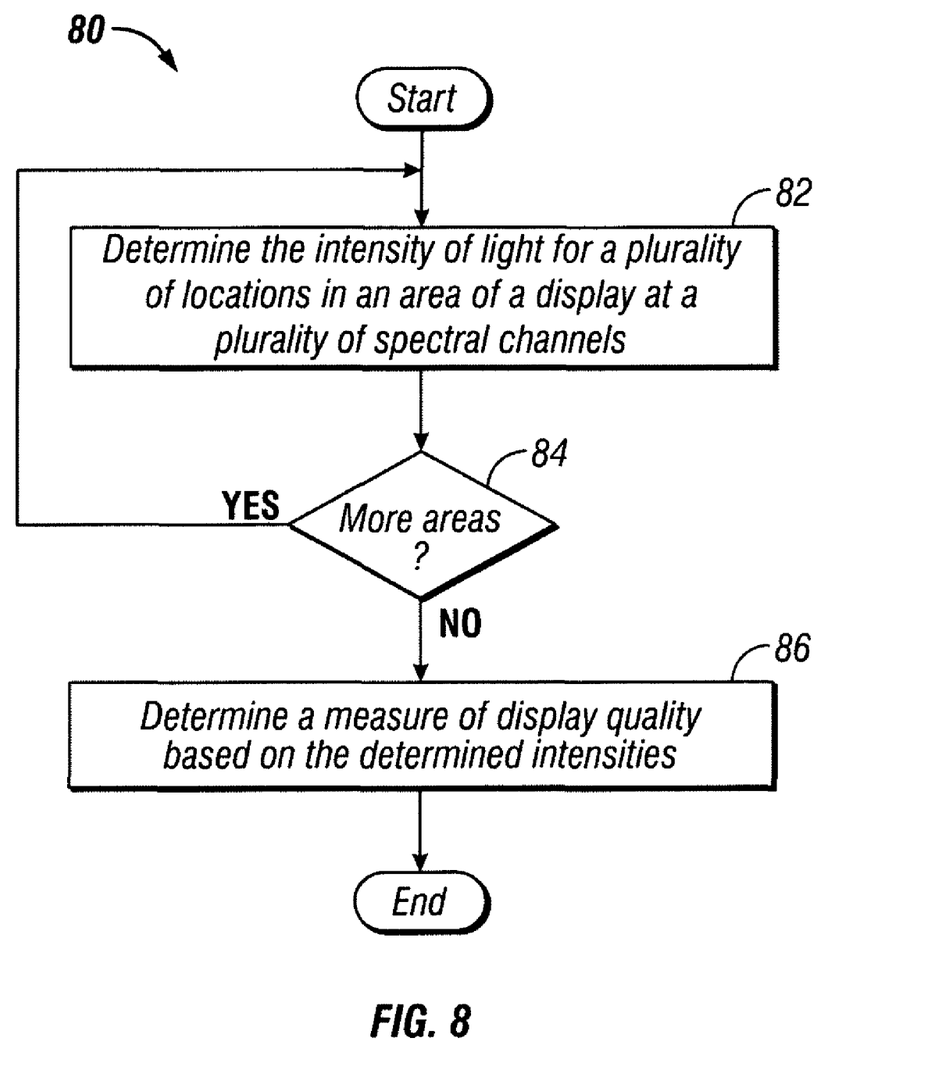
FIG. 8 is a flowchart illustrating a method of measuring the quality of a display.

FIG. 8 is flowchart illustrating a method of measuring the quality of a display. The process 80 begins, in block 82, with the determination of the intensity of light for a number of locations in an area of a display at a plurality of spectral channels. In one embodiment, the display is illuminated with a light source and the determined intensity of light is a measurement of the light reflected from an area of the display. In another embodiment, the display is illuminated with a light source and the determined intensity of light is a measurement of the light transmitted through the display. In yet another embodiment, the display acts as a light source and the determined intensity of light is a measurement of the light the display emits.

The area of the display is composed of a number of different locations, which are not necessarily immediately adjacent. Thus, the area of the display may comprise a number of non-contiguous sub-areas. Each pixel of the display may be represented by a number of different locations, thus the area of the display may cover a single pixel or many pixels. In one embodiment, the area is a linear region of the display. In another embodiment, the area comprises five points one generally corresponding to each corner of the display and another generally corresponding to the center. In yet another embodiment, the area comprises nine points generally forming a grid with three points along each edge of the display, and a point at the center.

Each spectral band is generally a contiguous region of the electromagnetic spectrum for which an intensity response is above a threshold. The threshold may be defined, for example, by a percentage of the maximum intensity response. For example, the spectral band defined by L cones of the human eye (which respond best to red light) is centered at about 564 nm but has over 50% intensity response between 500 nm and 630 nm. By determining the intensity of light for a number of locations at a larger number of spectral channels, a greater amount of spectral information about the area of the display can be derived, unlike using the human eye or a digital camera, which generally receives information for three spectral channels corresponding to blue, green, and red light. In one embodiment, the spectral channels include four spectral channels. These channels may generally correspond to blue, green, red, and either ultraviolet or infrared light. In another embodiment, the four spectral channels all correspond to visible portions of the spectrum. In yet another embodiment, five spectral channels are used. In another embodiment, at least one hundred spectral channels spaced along the electromagnetic spectrum are used. In a specific embodiment, four-hundred and eighty spectral channels are used, providing even greater amounts of spectral information.

The spectral channels generally span the visible spectrum as a set of contiguous bands, in one embodiment. For example the spectral channels may be so arranged, such that every wavelength in a specific range (e.g., the visible spectrum) is associated with at least one spectral channel having an intensity response of 50% or greater.

In block 84, it is determined if there are more areas of the display to measure. If it is so determined, the process 80 returns to block 82, where the intensity of light is determined for another number of locations of in an area of the display at four or more spectral channels. In one embodiment the second area is non-overlapping with the first area, but this is not necessarily the case. In one specific embodiment, where the first area is a linear region of the display, the second area is a parallel linear region of the display. By repeating the step in block 82 again and again for a number of linear regions, a hyperspectral image of the entire display can be formed. In general, by repeating the step in block 82 for a number of regions and appending the data for each repetition, a hyperspectral datacube can be formed for the display as shown in FIG. 9.

Figure 9:
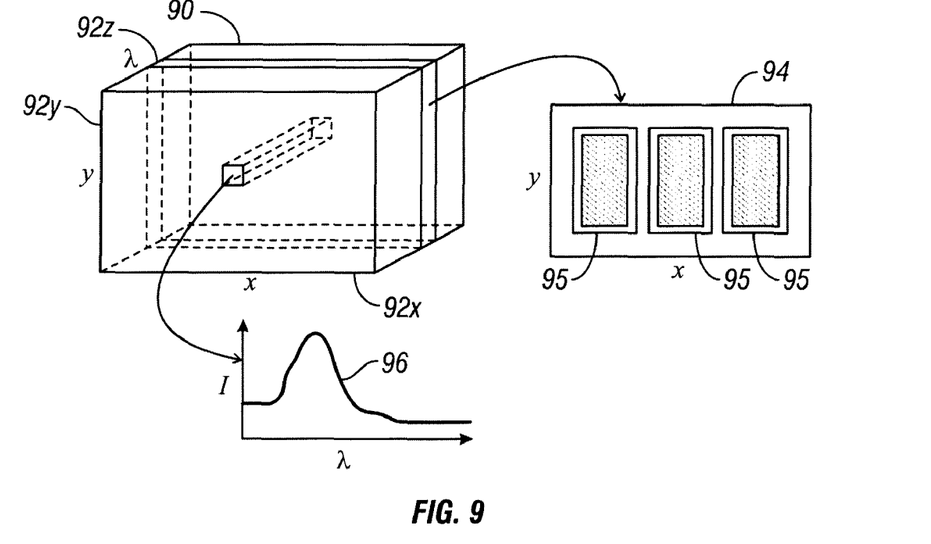
FIG. 9 is a diagram showing an exemplary datacube as captured by a hyperspectral imager.

FIG. 9 shows a hyperspectral datacube 90 having three axes corresponding to a first direction 92x, a second perpendicular direction 92y, and wavelength 92z. Each point in the hyperspectral datacube may represent an intensity of light at a particular location of the display at a particular wavelength, as represented by a narrow spectral channel. By appropriately cropping or filtering the hyperspectral datacube 90, a variety of relations can be analyzed. For example, by taking a single line 96 through the datacube 90 parallel to the wavelength axis 92z, a plot 96 of intensity versus wavelength can be derived for a particular location. By taking a slice 94 of the datacube parallel to the plane defined by the x-axis 92x and y-axis 92y, an image 94 showing the intensity of light at a particular wavelength for one or more displays 95 can be derived.

In block 86 of FIG. 8, a measure of display quality is determined based on the determined intensities. The display quality can be determined in any of a number of ways known to those skilled in the art. For example, the Video Electronics Standards Association (VESA) publishes a number of standard measurements of display quality including contrast ratios and uniformity tests. For example, a uniformity test can be performed by selecting the determined intensities of light at five locations, one location corresponding to each corner and another corresponding to the center of a display, determining a brightness for each location, and determining a measure of non-uniformity as one minus the ratio of minimum brightness to maximum brightness. Such a metric can also be used for nine locations defining a three-by-three grid, or for any number of locations.

The datacubes obtained from the hyperspectral imager, such as the datacube shown in FIG. 9, can be analyzed using wavelength filters and applying intensity thresholds to identify non-uniformity in the display. A wavelength filter may correspond to removing a slice 94 of the datacube 90, as discussed above. The display pixels are designed for maximum reflection at a specific wavelength. Filtering the data at specific wavelengths allows for a visualization of the brightness throughout the panel at those specific wavelengths. Brightness variations imply that the pixels are not uniform throughout the panel. The causes for the non-uniformity may be pixel gap variations due to plate shapes, plate bends, and/or mechanical failure. For other display systems, the causes for non-uniformity include liquid crystal alignment variations for LCD-based displays, phosphor chemical changes for traditional CRT displays, material variations for OLED-based displays, and variation in breakdown characteristics for plasma displays.

The datacube can also be used to define color parameters or chromaticity for a number of locations of the display. The color parameters that are outputted may be any suitable color parameters such as CIE (Commission Internationale de l'Eclairage) standard (X,Y,Z) tristimulus values, (x,y) color parameters, or (u',v') color parameters. Because the distance between the reflective layers at each location in an interferometric modulator determines the color of light reflected from that location, one method for determining distance is to determine the color of light reflected from the location by appropriately analyzing a hyperspectral datacube. The spectrum at each of a number of locations can be fit to a Fabry-Perot interferometer optical model to solve for the distance that would give the measured spectrum. It will be appreciated that this approach may be used for determining distances between reflective layers in any Fabry-Perot interferometer including interferometric modulators.

Once a number of locations of the display are evaluated, the determined reflective layer distance as a function of two-dimensional position may be displayed to a user or further evaluated. In one embodiment, the results are displayed as a two-dimensional spatial map to the user. For example, the results may be displayed as a contour plot or a surface plot. In addition, statistical analyses may be performed on the data set represented in the maps. For example, the minimum, maximum, average, and median distances may be determined. In addition, an overall tilt or orientation in the variation of distance may be determined. Such a determination is indicative of the tilt or orientation of the reflective layers in the interferometric modulator. These statistical parameters may in turn be compared to similar parameters for other interferometric modulators in the same array and/or other arrays to obtain overall statistical measures such as the distribution of the minimum, maximum, average, and median across an array or series of arrays. These statistical measures can provide an indication of manufacturing defects within a single array or series of arrays. In addition, the parameters can be used to modify and improve manufacturing processes to obtain a desired result.

As will be recognized by those skilled in the art, the data represented by a hyperspectral datacube can be used in a number of ways to determine measures of display quality. Determined measures may include qualitative measures, such as a number between 0 and 1 or 1 and 100 indicating a relative quality of the display. Determined measures may also include binary measures, such as either a 'yes' or a 'no', or perhaps either a 1 or a 0, indicating that the display passes or fails some test of quality. The measure of display quality may be a function of location and/or a function of wavelength.

Figure 10:
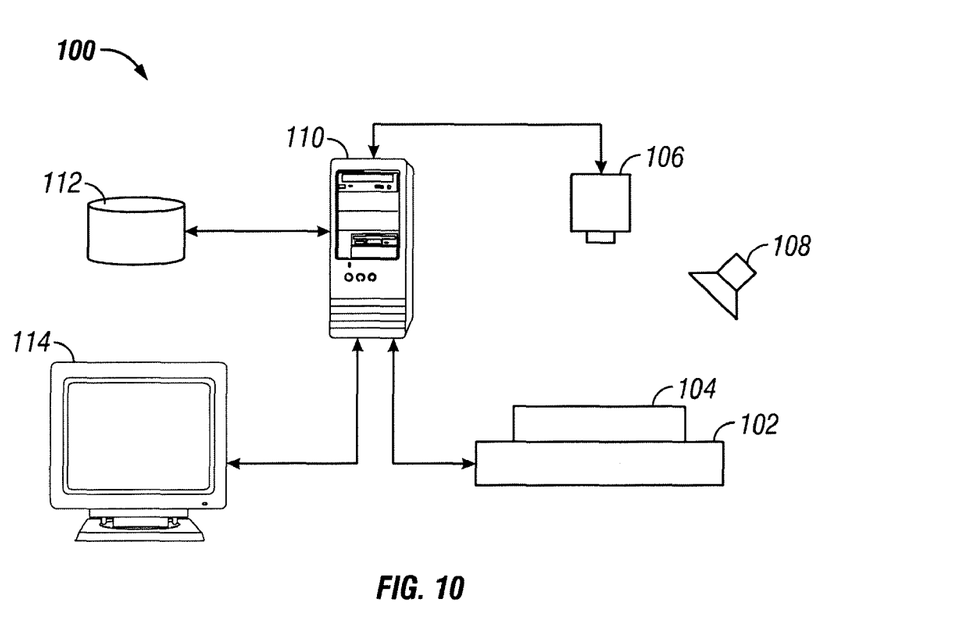
FIG. 10 is a functional block diagram of a system for measuring the quality of a display.

In some embodiments, the method is performed by an automated system for measuring the quality of a display. FIG. 10 is a functional block diagram of a system for measuring the quality of a display, which may be automated or may require human intervention. The system 100 includes a stage 102 on which is mounted a display 104. The display may be illuminated by one or more light sources 108 and imaged with a hyperspectral imager 106. The hyperspectral imager (and, optionally the stage 102 and the light source 108) are connected to a processor 110 having a data storage 112 and an output 114.

The stage 102 may be a x-y stage used to move the display 104 relative to the hyperspectral imager 106 and/or light source 108 in order to select a region for illumination and imaging. The stage 102 may be connected to the processor 110 for receiving instructions indicative of when or how much to move the display 104. The stage 102 may include motors capable of moving the display 104 in both an x-direction and a perpendicular y-direction. The stage 102 may further be capable of moving the z-direction (towards or away from the hyperspectral imager 106) or rotating the display about any axis. The stage 102 may also include a heating/cooling component for testing the display at a number of temperatures.

The hyperspectral imager 106 may be any device capable of simultaneously determining an intensity of light for a plurality of locations in a first area of the display 104. An exemplary hyperspectral imager 106 is the Pika II made by Resonon Inc. of Bozeman, Mont.

The light source 108 may be advantageously positioned so as to illuminate the portion of the display 104 being imaged by the hyperspectral imager 106. In one embodiment, the hyperspectral imager 106 images, at one time, a linear portion of the display 104, thus the light source is a tube that uniformly lights at least a linear portion of the display 104. In other embodiments, the light source may be arranged as a square of four or more light bulbs so as to uniformly illuminate a large area to be imaged by the hyperspectral imager 106.

The light source 108 may be chosen to provide light having a desired spectral and intensity characteristics. For example, it may be desirable to have the light source 108 approximate the characteristics of the light source that will typically be used to view an interferometric modulator display. In one embodiment, a standard D65 light source is used. In some embodiments, the light source 108 may be coupled to the processor 110 or a separate illumination control device, such as a device having a Koehler design. The aperture of the illumination control device may be adjusted to illuminate only the area of interest on the display.

The processor 110 may be operatively coupled to the stage 102, the hyperspectral imager 106, the light source 108, the data storage 112, and/or the output 114 for receiving or transmitting data or instructions. The processor may be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a conventional single- or multi-chip processor such as a Pentium® processor, Pentium II® processor, Pentium III® processor, Pentium IV® processor, Pentium® Pro processor, a 8051 processor, a MIPS® processor, a Power PC® processor, or an ALPHA® processor. The processor 110 may also be controller, microcontroller, or state machine. The processor 110 may also be implemented as a combination of computing devices, e.g., a combination of a DSP and a microprocessor, a plurality of microprocessors, one or more microprocessors in conjunction with a DSP core, or any other such configuration. The processor 110 is coupled to the data storage 112 via a bus (not shown). The bus may be responsible for parsing or formatting data such that data sent from the processor is in a form more appropriate for the data storage 112 or vice versa. This may include compression/decompression, coding/decoding, or encryption/decryption.

The data storage 112 is configured to store data and embodies electronic circuitry that allows information, which is typically computer data, to be stored and retrieved. The storage module may also include external devices or systems such as, for example, disk drives or tape drives. The data storage 112 may include RAM memory, flash memory, ROM memory, EPROM memory, EEPROM memory, registers, hard disk, a removable disk, a CD-ROM, or any other form of storage medium known in the art. An exemplary data storage is connected to the processor such the processor can read information from, and write information to, the storage medium. In the alternative, the storage medium may be integral to the processor. For example, the processor 112 and the data storage 112 may reside in an ASIC or in any suitable commercially available chipset.

The processor 110 may also comprise software or modules configured to read data from the data storage 112 that corresponds to a datacube generated with data from the hyperspectral imager 106. The datacube can be read and analyzed by software specifically designed for the hyperspectral imager 106, such as Spectronon or SpectrononPro developed by Resonon Inc. The datacube may also or alternatively be read and analyzed by MATLAB developed by The Mathworks, Inc. or Excel developed by Microsoft.

The processor 110 is further connected to the output 114 for providing information regarding the determined intensities or determined measurements of display quality. The output may be a monitor, a printer, a network connection, an alarm, a buzzer, or another processor. The processor 110, for example, may be configured to generate, via the output 114, an alert when an alert when the display is determined to have a measure of display quality that does not comply with a pre-determined specification. Accordingly, the system may be used in a quality control process to automatically identify defective displays.

CONCLUSION

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of measuring the quality of a display, the method comprising:
   determining an intensity of light with a hyperspectral imager for a plurality of locations in a first area of a display for a plurality of spectral channels; and
   determining a measure of display quality based on the determined intensities.

2. The method of claim 1, wherein the light is reflected by, transmitted through, or emitted by the display.

3. The method of claim 1, wherein determining the intensity comprises determining the intensity for four or more spectral channels.

4. The method of claim 3, wherein determining the intensity comprises determining the intensity for five or more spectral channels.

5. The method of claim 4, wherein determining the intensity comprises determining the intensity for at least one hundred spectral channels.

6. The method of claim 5, wherein determining the intensity comprises determining the intensity for about four-hundred and eighty spectral channels.

7. The method of claim 1, wherein the spectral channels span at least the visible spectrum.

8. The method of claim 1, wherein the spectral channels include at least one non-visible component.

9. The method of claim 1, further comprising, subsequent to determining an intensity of light for a plurality of locations in a first area, determining an intensity of light with the hyperspectral imager for a plurality of locations in a second area of the display for the plurality of spectral channels.

10. The method of claim 9, further comprising determining the intensity of light for at least ten areas of the display.

11. The method of claim 9, further comprising, subsequent to determining an intensity of light for a plurality of locations in a first area and prior to determining an intensity of light for a plurality of locations in a second area, moving the display with respect to the hyperspectral imager.

12. The method of claim 1, wherein the plurality of locations in the first area are collinear.

13. The method of claim 12, further comprising determining an intensity of light with the hyperspectral imager for a plurality of collinear locations in a second area, wherein a first line defined by the plurality of collinear locations in the first area is parallel to a second line defined by the plurality of collinear locations in the second area.

14. The method of claim 1, wherein the determining a measure of display quality comprises determining a measure of display quality according to Video Electronics Standards Association (VESA) standards.

15. The method of claim 1, wherein the measure of display quality is based on a multi-point measurement.

16. The method of claim 15, wherein the multi-point measurement comprises a five-point measurement or a nine-point measurement.

17. A system for measuring the quality of a display, the system comprising:
- a hyperspectral imager configured to determine an intensity of light for a plurality of locations in a first area on a display for a plurality of spectral channels; and
- a processor configured to determine a measure of display quality based on the determined intensities.

18. The system of claim 17, further comprising a stage configured to move the display relative to the hyperspectral imager.

19. The system of claim 18, wherein the stage is configured to move the display relative to the hyperspectral imager in at least two directions.

20. The system of claim 18, wherein the stage is configured to heat or cool the display.

21. The system of claim 17, further comprising a light source configured to uniformly illuminate at least a portion of the display.

22. The system of claim 21, wherein the illuminated portion is a line.

23. The system of claim 21, wherein light is generated by the light source and reflected by the display.

24. The system of claim 17, further comprising a data storage configured to store at least one of the determined intensities of light or the determined measure of display quality.

25. The system of claim 17, further comprising an output configured to output the measure of display quality.

26. The system of claim 17, further comprising an alert configured to indicate when a display does not conform to a pre-determined specification.

27. A method of generating a hyperspectral datacube, the method comprising:
- determining an intensity of light with a hyperspectral imager for a plurality of locations in a two-dimensional area of a display for a plurality of spectral channels; and
- storing the determined intensities in a datacube on a computer-readable storage, the datacube being indexed by at least a first parameter corresponding to a first direction, a second parameter corresponding to a second direction, and a third parameter corresponding to wavelength.

* * * * *